UNITED STATES PATENT OFFICE.

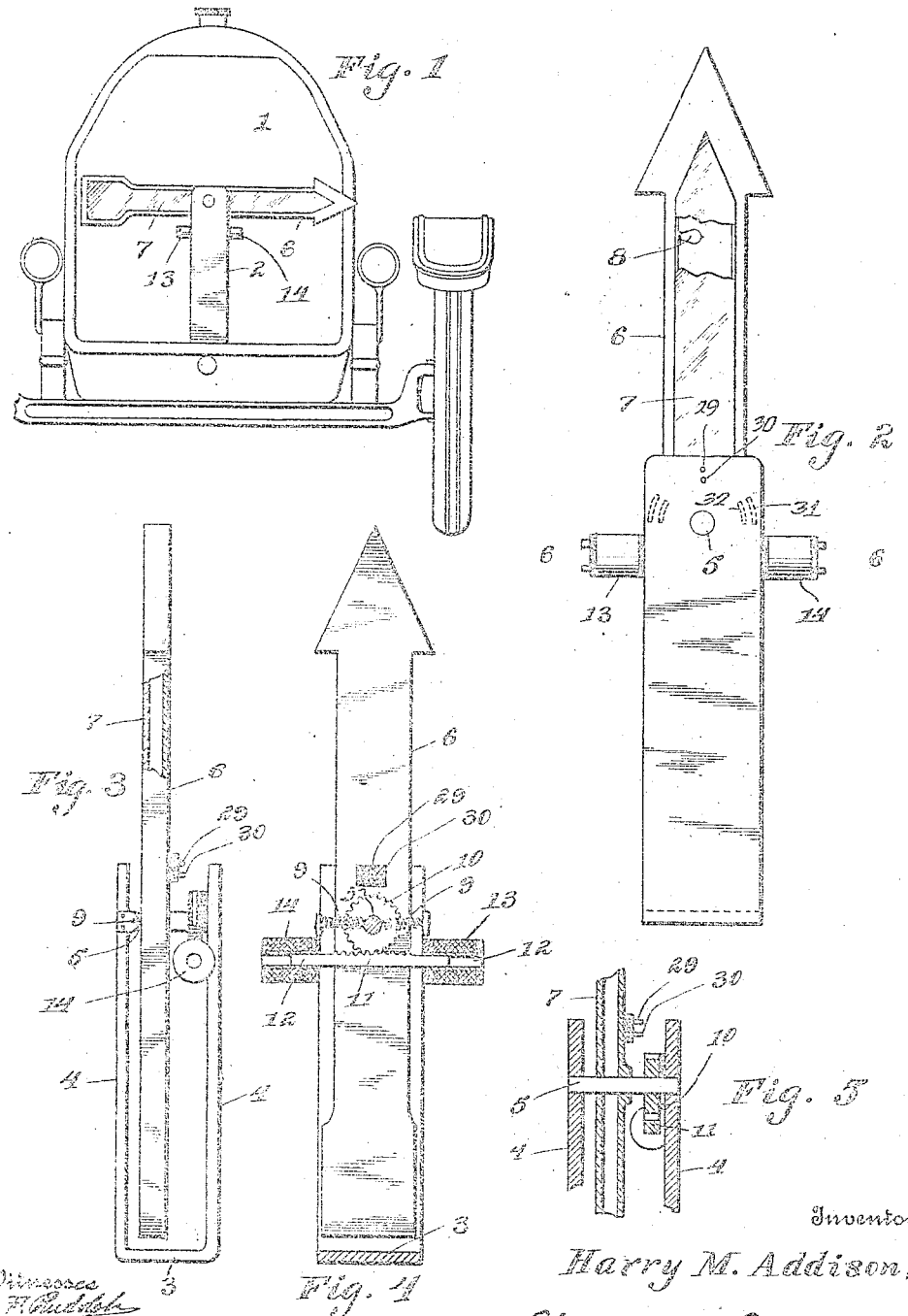

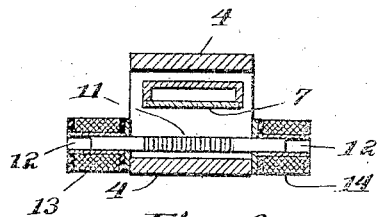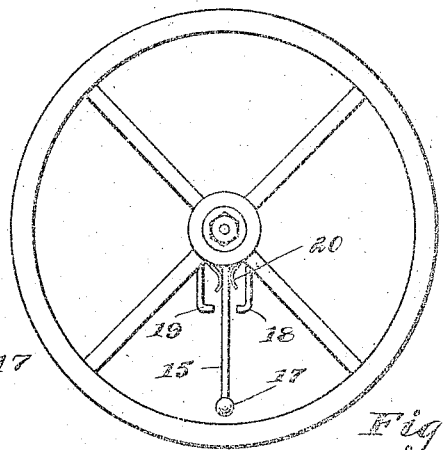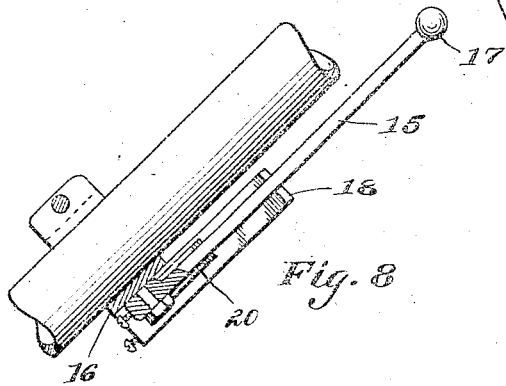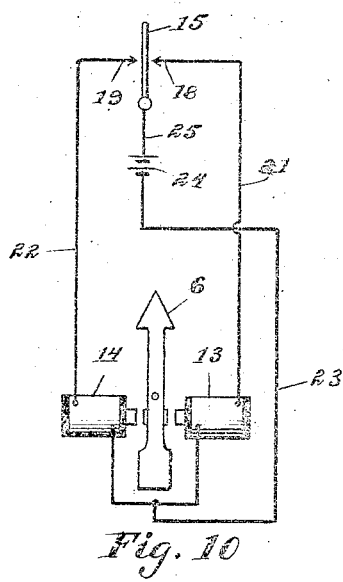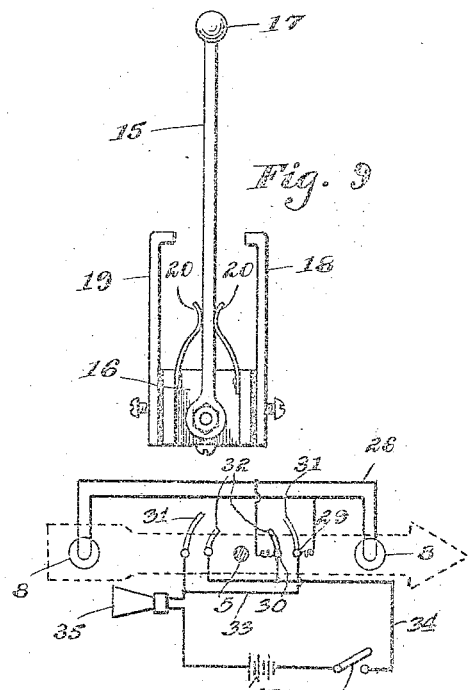

HARRY M. ADDISON, OF SAN DIEGO, CALIFORNIA.

SIGNAL DEVICE FOR VEHICLES.

1,251,165. Specification of Letters Patent. Patented Dec. 25, 1917.

Application filed December 4, 1915. Serial No. 65,104.

*To all whom it may concern:*

Be it known that I, HARRY M. ADDISON, a citizen of the United States, residing at San Diego, in the county of San Diego and State of California, have invented new and useful Improvements in Signal Devices for Vehicles, of which the following is a specification.

This invention relates to improvements in signal devices for vehicles and has particular application to a direction indicator for motor vehicles.

In carrying out the present invention, it is my purpose to provide a direction indicator for motor vehicles whereby the driver of the vehicle may notify pedestrians and the drivers of other vehicles of the direction in which he is about to steer his car so that such pedestrians and other drivers may act accordingly, thereby preventing collisions and eliminating the congestion of traffic at corners, etc.

It is also my purpose to provide a direction indicating device wherein the controlling means will be located within convenient reach of the driver or operator of the vehicle so that the indicator may be brought into service quickly and conveniently by the operator without the necessity of the operator leaving his seat.

I also aim to provide a direction indicating signal for motor vehicles which may be illuminated at night so as to render the same clearly visible and wherein the component parts will be so arranged and correlated as to reduce the possibility of derangement to a minimum.

With the above and other objects in view, the invention consists in the construction, combination and arrangement of parts hereinafter set forth in and falling within the scope of the claim.

In the accompanying drawings:

Figure 1 is a fragmentary front elevation of a motor vehicle showing my improved traffic signal mounted thereon.

Fig. 2 is an enlarged front elevation of the signal device removed from the vehicle.

Fig. 3 is a view in side elevation of the same.

Fig. 4 is a vertical sectional view through the signal device.

Fig. 5 is a similar view taken at right angles to Fig. 4.

Fig. 6 is a horizontal sectional view on the line 6—6 of Fig. 2.

Fig. 7 is a plan view of the controlling means of the signal device, the same being shown as located upon the steering column of the motor vehicle.

Fig. 8 is a fragmentary vertical sectional view through the steering column and controlling means thereon.

Fig. 9 is a transverse sectional view through the same.

Fig. 10 is a diagrammatic view showing the circuit connections between the signal device and the controlling means.

Fig. 11 is a diagrammatic view showing the circuit connections between the alarm device which coacts with the signal as hereinafter described.

Referring now to the drawings in detail, 1 designates the front portion of a motor vehicle of suitable construction, while 2 indicates my improved signal device as an entirety. This signal device embodies a base plate 3 appropriately secured to the vehicle, standards 4, 4 uprising from the base plate 3 and spaced apart in parallelism longitudinally of the vehicle and carrying a shaft 5 adjacent to the upper end thereof, the extremities of the shaft 5 being journaled in horizontally alining bearings formed in the standards 4. 6 designates a hollow arrow-shaped indicating finger mounted centrally upon the shaft 5 and disposed between the standards 4, 4 and having the front wall thereof formed of translucent or transparent material 7. Disposed within the finger 6 and suitably secured to the walls thereof are incandescent lamps 8 whereby the indicating finger may be illuminated. Surrounding the shaft 5 and disposed upon the opposite sides of the finger 6 are restoring springs 9, 9 respectively, each having one end fastened to the indicating finger and the remaining end secured to the adjacent standard, such springs acting to hold the finger 6 normally in vertical position and designed to restore such finger to vertical position succeeding the swinging of the finger in one direction or the other to a horizontal position. Keyed upon one end portion of the shaft 5 is a pinion 10 meshing with a horizontally disposed rack bar 11 slidably mounted within horizontally alining bearings carried by the adjacent standard 4 and secured to the extremities of the rack bar 11 are cores 12, 12 working within solenoids 13 and 14 respectively secured to the opposite side edges of the adjacent standard 4. When the solenoid 13 is energized the rack bar 11 is actuated to rotate the shaft 5 against the action of the springs 9 to throw the indicator finger 6 to horizontal position with the pointed extremity thereof pointing in one direction, while when the solenoid 14 is energized the indicator finger is swung to horizontal position with the pointed end thereof pointing in the opposite direction and when the finger is relieved of the influence of the solenoids, the springs 9 react to restore the finger to vertical position. These springs 9 preferably work in opposition to each other to insure the proper return of the finger to normal position.

In the present instance, the controlling switch for the solenoids 13 and 14 is located upon the steering column of the motor vehicle in order that the same may be within convenient reach of the driver or operator of such vehicle and this switch comprises a lever 15 pivoted at one end upon a bracket 16 carried by the steering column and having the remaining end equipped with a handle 17. Also secured to the bracket 16 and disposed at the opposite ends of the path of movement of the lever 15 are contact studs 18 and 19, the stud 18 being adapted to be engaged by the lever 15 when the latter is swung in one direction and the stud 19 being adapted to be engaged by the lever when the latter is swung in the opposite direction. 20 designates leaf springs, each having one end secured to the bracket 16 and the remaining end bearing against one side of the lever 15, such springs serving to hold the lever 15 in normal position, that is, centrally of the distance between the contacts 18 and 19. In the present instance, the contact stud 18 is connected by means of a wire 21 with one terminal of the solenoid 13, while the contact 19 is connected by way of a wire 22 with one terminal of the solenoid 14 and the remaining terminals of the solenoids 13 and 14 are connected by means of a common conductor 23 with a suitable source of electrical energy, such, for instance, as a battery 24. From the remaining side of the battery 24 leads a conductor 25 terminally connected with the lever 15. By means of these circuit connections, it will be seen that when the lever 15 is swung into engagement with the contact 18, the solenoid 13 will be energized to actuate the indicator finger as previously described, while when the lever is swung in the opposite direction to engage the contact 19, the solenoid 14 will be energized with the effect to swing the indicator finger to point in the opposite direction, as previously described.

In the present instance, the lamps 8 in the indicator finger 7 are connected in a local circuit 26, as indicated in Fig. 11. Conductors lead from the opposite wires of this circuit to respective contacts 29 and 30 carried on the rear side of the indicator finger. Disposed on opposite sides of the pivotal center of the indicator are pairs of contacts, comprising segments 31 and 32, one of the segments 31 being adapted to engage contact 29 when the indicator finger is in either of its horizontal positions, and the segments 32 being adapted to engage the contact 30 when the indicator finger is in either of its horizontal positions. A conductor 33 leads from the contact 31 to one pole of the battery 27, and an audible signal 35 may be put in circuit therein, as indicated in Fig. 11. A conductor 34 leads from the contacts 32 to the other pole of the battery and has a switch 28 in circuit therewith whereby the circuit may be opened or closed. When the switch 28 is closed the circuit is completed when the indicator finger assumes either of its horizontal positions, by contacts 29 and 30 engaging respective contacts 31 and 32, and the indicator finger is illuminated thereby and the audible signal is actuated thereby.

While I have herein shown and described one preferred form of my invention by way of illustration, I wish it to be understood that I do not limit or confine myself to the precise details of construction herein described and delineated, as modification and variation may be made within the scope of the claims without departing from the spirit of the invention.

I claim:

In a signal device of the character described, a U-shaped frame, a shaft mounted for rotation near the free ends of the side members thereof and extending across the inclosure formed thereby, an indicator finger mounted on said shaft between the side members of the frame, a gear mounted on said shaft between the indicator finger and the rear side member of said frame, springs connected to the opposite sides of said shaft between said indicator finger and the front side member of the frame and having their other ends connected to said frame whereby the finger tends to assume a vertical position, hollow solenoids mounted on the rear side member and having their axes parallel, a common core slidably mounted within said solenoids and having a rack engaging said gear whereby the finger will assume one of its horizontal positions when one of the solenoids are energized and assume the other horizontal position when the other solenoid is energized.

In testimony whereof I affix my signature in presence of two witnesses.

HARRY M. ADDISON.

Witnesses:
MARY E. ANDERSON,
FRANK T. ELLIS.